July 29, 1969 R. A. TAYLOR ET AL 3,458,827
TEMPERATURE COMPENSATING SIGNAL TRANSMITTER
Filed July 24, 1967 3 Sheets-Sheet 1

INVENTORS
RAYMOND A. TAYLOR
RAPHAEL F. EHAT
BY
ATTORNEY

INVENTORS
RAYMOND A. TAYLOR
RAPHAEL F. EHAT

BY *Charles B Curry*

ATTORNEY

INVENTORS
RAYMOND A. TAYLOR
RAPHAEL F. EHAT

BY *Charles B Curry*

ATTORNEY

United States Patent Office 3,458,827
Patented July 29, 1969

3,458,827
TEMPERATURE COMPENSATING SIGNAL
TRANSMITTER
Raymond A. Taylor, San Mateo, and Raphael F. Ehat,
Daly City, Calif., assignors to the United States of
America as represented by the Secretary of the Navy
Filed July 24, 1967, Ser. No. 655,679
Int. Cl. H03f 3/18, 1/34
U.S. Cl. 330—13                                    4 Claims

ABSTRACT OF THE DISCLOSURE

An electronic device for amplifying and transmitting electrical signals that includes a temperature compensating network and a distributed bridge loading network. The device includes an amplifier having two transistors which provide two stages of gain followed by a common collector complementary symmetry output stage having two transistors. A negative feedback is employed where the output of the amplifier is fed back to the emitter of the first transistor through a resistor ($R_F$) and is shunted by the parallel combination of a thermistor and compensating resistor ($R_n$). Temperature compensation is achieved by matching this thermistor-resistor network to a scintillator-photomultiplier tube for changes of temperature such that the negative feedback is varied to provide a constant gain irrespective of variation in temperatures of from about 0 to 50° C. The distributed bridge loading network includes the two output stage transistors that are arranged in a push-pull relationship which provides maximum linearity before the addition of distortion-reducing feedback. The output stage is symmetrically biased to provide maximum linearity of response throughout the maximum negative swing possible. In addition, the output stage is combined with the coaxial cable and terminating load to provide sufficient signal current to linearly drive a relative long coaxial cable.

The invention described herein may be manufactured and used by or for the Government of the United States of America for governmental purposes without the payment of any royalties thereon or therefor.

The present invention relates to an amplifier and more particularly to temperature compensating transistor unity gain amplifier having a distributed bridge loading network for use as a coaxial-cable-line driver over fairly long distances.

The present invention is the outgrowth of need for the transmission of signals over relatively long distances from photomultiplier devices which are operating over a temperature range of from about 0° C. to about 50° C. It is necessary that this transmission be achieved with the minimum of distortion, i.e., maximum linearity. Typical use of this temperature-compensating transistorized linear unity gain amplifier is with a mobile gamma ray scintillation spectrometry system. For example, it has been found that the differential linearity of this amplifier and system is at least ±1 percent with input signals up to three volts when loaded with a terminated 93 ohm 500-foot coaxial cable. The use of a thermistor temperature-compensing network in the amplifier of the detector-amplifier unit gives a system gain variation, normalized at 25° C. as a function of temperature, of less than +4 percent between 0° C. and 25° C., and less than −1 percent between 25° C. and 50° C.

Briefly, the present invention comprises an electronic device including an amplifier which is used to amplify the signal of a scintillator-photomultiplier combination and transmitting this signal over a relatively long length of coaxial cable. One important feature of the present invention is its capability of compensating for the crystal or scintillator-photomultiplier gain change due to temperature changes of from about 0 to 50° C. Another important feature is its capability of linearly driving a long length of coaxial cable, for example, 2,000 feet, which may be terminated with its characteristic impedance. The amplifier of the present invention generally consists of two transistors which provide two stages of gain followed by a common collector complementary symmetry output circuit having two transistors. Negative feedback is employed where the output of the amplifier is fed back to the emitter of the first transistor through a resistor ($R_F$) and is shunted by the parallel combination of a thermistor and compensating resistor ($R_n$). Temperature compensation is achieved by matching this thermistor-resistor network to the scintillator-photomultiplier tube combination for changes of temperature such that the degenerative or negative feedback is varied to provide a constant gain irrespective of variation in ambient temperature of from about 0 to 50° C. The two output transistors are arranged in a push-pull relationship which provides maximum linearity before the addition of distortion-reducing feedback. The output transistors are asymmetrically biased to provide maximum linearity of response and to provide the maximum negative swing possible. In addition, the output stage is combined with the coaxial cable and terminating load to provide sufficient signal current to linearly drive at least a 500 foot coaxial cable terminated with about 93 ohms with pulse signals up to 3 volts in amplitude.

Other objects and many of the attendant advantages of this invention will be readily appreciated as the same becomes better understood by reference to the following detailed description when considered in connection with the accompanying drawings wherein.

Figure 1:
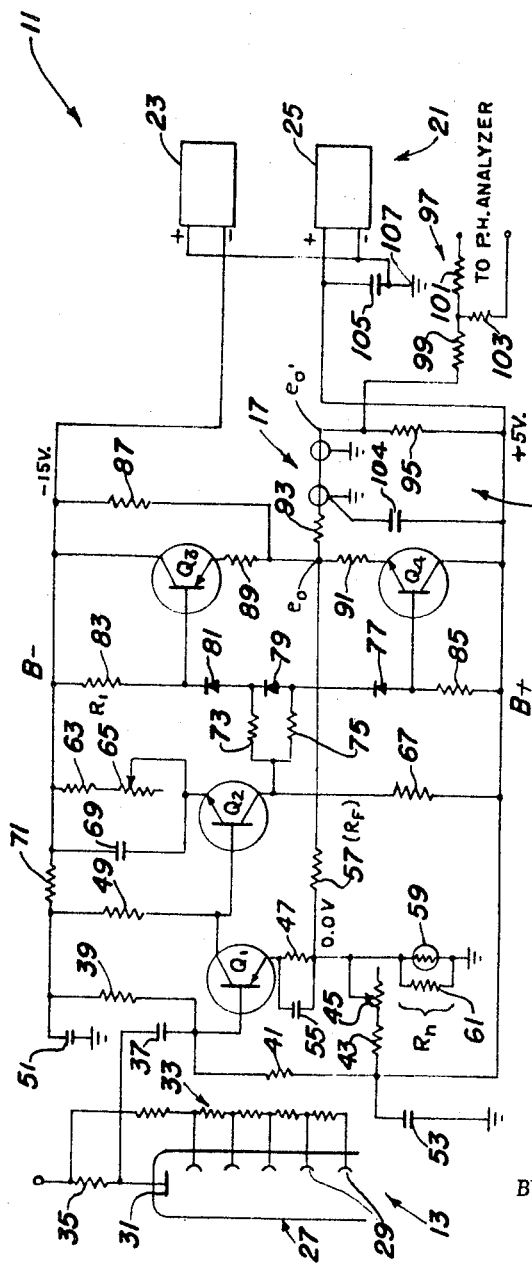
FIG. 1 is a schematic drawing of the amplifier and associated circuitry of the present invention.

In FIG. 1 is illustrated the detection system 11 of the present invention. The principle components of detection system 11 include photomultiplier 13 having a scintillator, not shown, amplifier circuit 15, coaxial cable 17, distributed bridge loading network 19, and power supply circuit 21 including negative power supply 23 and positive power supply 25.

Photomultiplier tube 13 includes an envelope 27, a plurality or dynodes 29 and anode 31. High voltage power is supplied through resistive network 33 to the dynodes of the photomultiplier and to the anode 31 through resistor 35. The output of anode 31 of photomultiplier 13 is transmitted through capacitor 37 to the base of transistor Q1. The B+ and B− power is applied to transistor Q1 through a plurality of resistors 39 through 49 which set the operating voltages of the various elements of transistor Q1. Capacitors 51 and 53 function to shunt any AC signal or voltage spikes appearing on the B+ and B− supplies to ground. The function of capacitor 55, which is connected to the emitter of transistor Q1 and in parallel across resistor 47, is to transmit the degenerative or negative AC feedback signal from the output stage of amplifier 15, which includes transistors Q3 and Q4, to the emitter of transistor Q1. The function of resistor 57 ($R_F$) is to attenuate the negative feedback signal in a manner hereinafter described.

The temperature compensating network of the present invention includes thermistor 59 and resistor 61 which is connected in parallel across thermistor 59. This temperature compensating network has a combined resistance referred to as $R_n$ and cooperates with resistor 57 ($R_F$) in a manner hereinafter described.

The second stage of the amplifier circuit includes transistor Q2 which has the operating voltages thereof set by resistors 49, 63, 65, and 67. Capacitor 69 functions to shunt signals around resistors 63 and 65 to minimize open-loop gain loss. The output of the second stage transistor Q2 is applied to the bases of transistors Q3 and Q4 through a resistor-diode network including resistors 73, 75, 83, and 85 and diodes 77, 79 and 81. This resistor diode network is conventional and therefore the operation thereof will not be described in detail. However, it should be noted that this network functions to condition the output signal from transistor Q2 to supply the bias levels required by transistors Q3 and Q4. Resistors 87, 89 and 91 also function to set the operating currents of transistors Q3 and Q4. The outputs from transistors Q3 and Q4 are applied to the input of coaxial cable 17 through resistor 93.

The load circuit 19 includes resistor 95 and attenuating circuit 97 which includes resistors 99, 101 and 103. It should be particularly noted that transistor Q3 is negatively biased with B− power and transistor Q4 is positively biased with B+ power respectively by high voltage power supply 23 and low voltage power supply 25. In addition, it should be particularly noted that the positive biasing of transistor Q4 is substantially lower than the negative biasing of transistor Q3 for reasons which will be hereinafter discussed. Capacitor 105 is used to insure that the load end of coaxial cable 17 is terminated to AC signal ground 107 with matching resistor 95 even though the latter is connected to B+ power supply 25, and the source end of the B+ power supply is connected to AC signal ground by capacitor 104.

In operation, transistors Q1 and Q2 afford two stages of gain followed by a common collector complementary symmetry output circuit including transistors Q3 and Q4. Negative feedback is achieved by feeding the outputs of transistors Q3 and Q4 of amplifier 15 back to the emitter of transistor Q1 through resistor 57 ($R_F$) and the parallel combination of thermistor 59 and resistor 61. To provide maximum linearity, the overall gain of the amplifier is selected to be approximately unity. In order to minimize base line shift due to capacitive storage in the system the amplifier is directly coupled to the coaxial cable as distinguished from the usual capacitive coupling. It is necessary to provide resistor 93, having a small resistance of, for example, 3.3 ohms, for stabilization.

Figure 2:
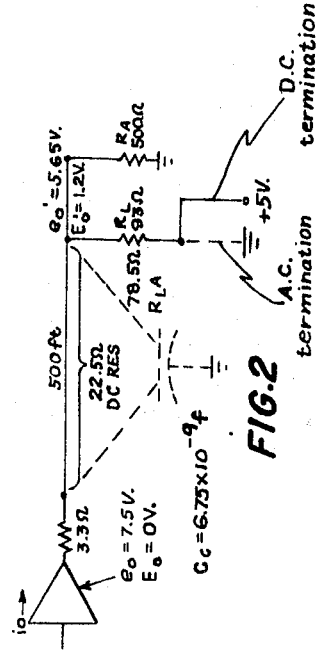
FIG. 2 is a schematic diagram illustrating the amplifier output loading network.

The following is given by way of example to illustrate typical use of the detection system 11 of the present invention which description will be made in conjunction with the diagrams set forth in FIGS. 2, 3 and 4. A total power potential from high voltage power supply 23 and low voltage power supply 25 of 20 volts is provided and therefore a total signal swing of about 7.5 volts, ($e_o$) of FIG. 2, is permissible. This peak value of signal ($e_o$) of 7.5 volts is reduced by the loss of resistor 93 and the loss of the resistance of coaxial cable 17 to 5.65 volts. This gives a substantial safety factor over the 3 volt signal swing typically specified to be desirable at a pulse height analyzer, not shown, where the net load resistance ($R_{LA}$) is 78.5 ohms. The output transistors Q3 and Q4 of FIG. 1 together share the signal current demands of the load which extends from no signal or zero load current to a maximum value of $$I_o = \frac{e_o'}{R_{LA}} = \frac{5.65}{78.5} = 72 \text{ milliamperes} \quad (1)$$

Transistors Q3 and Q4 were both chosen with current gains ($\beta$) that peak in the 70 ma. region to minimize the slope of $d\beta/dI$. At the center of the output stage dynamic range transistors Q3 and Q4 conduct a series current of about 80 ma. A typical use of this amplifier is with negative input pulses and it is to be non-inverting and therefore the quiescent operating point was adjusted to correspond to the positive signal extreme. With this bias point and with an ideal pair of transistors, transistor Q3 would conduct one-half the signal current less than 80 ma., or $$80 - \frac{72}{2} = 44 \text{ ma.}$$

and transistor Q4 would conduct this much more than 80 ma., or $$80 + \frac{72}{2} = 116 \text{ ma.}$$

In order to illustrate the need for a high voltage supply and a low voltage supply, consider first the use of two voltage supplies having equal output voltages of +10 volts and −10 volts respectively and, second, the output stage with a base line or quiescent bias in which transistor Q4 is conducting 72 ma. more than transistor Q3. With these two stipulations the preamplifier output ($e_o'$) would be at +5.65 volts with respect to the grounded center of the power supplies as deduced from Equation 1. This undesirable DC component is eliminated by increasing the magnitude of the negative supply to −10−5.65=15.65 v. and decreasing the magnitude of the positive supply to +10−5.65=+4.35 v. An approximation of these conditions could be achieved by a high voltage power supply 23 having −15 v. output and a low voltage power supply 25 having +5 v. output. This therefore enables the quiescent output to be brought to ground potential.

It is desirable to connect the coaxial cable terminating resistor 95 to the positive power supply rather than to ground 107 to avoid degrading the linearity of the output stage. By doing this the 0.0 signal output level is increased to about +1.2 v. at the cable termination which is indicated by the symbol $E_o'$ of FIG. 2. However, since the signal is attenuated, in the given example, by about 16 db between the cable output and the analyzer input, the signal baseline offset is reduced to about 230 millivolts. It was found that this offset did not affect the linearity of the analyzer or introduce threshold problems. However it might be noted that by increasing the negative B− voltage to about −16.2 v. and decreasing the B+ voltage to about +3.8 v. that ground potential could be achieved at $E_o'$ of FIG. 2.

Figure 3B:
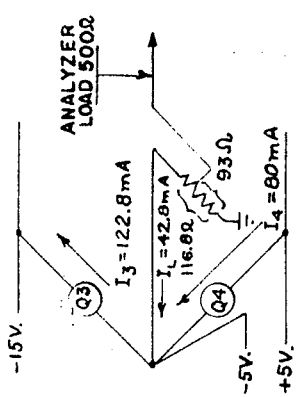
FIG. 3A through 3D are schematic drawings illustrating the interrelationship between the output stage of the amplifier and the loads to which the amplifier is connected.
Figure 3D:
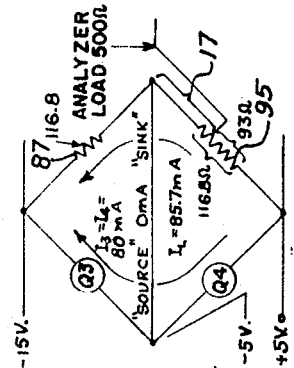
Figure 3A:
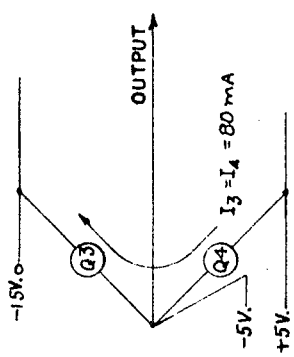
Figure 3C:
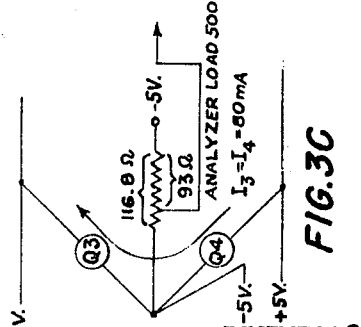

Full advantage of the excellent linearity, before feedback, of the complementary symmetry output stage is realized only with a load that does not appreciably disturb the symmetry system. To illustrate the unique features of the output stage of the present invention transistors Q3 and Q4 may be considered to be one side of a Wheatstone bridge as indicated in FIG. 3A. It should be particularly noted that the center of symmetry, that is, the median bias is at −5 v. and not at ground potential in the FIG. 3A arrangement. Therefore, if the load is applied with its reference terminal grounded as in FIG. 3B( the conventional method) the load draws current at the median bias of −5 v. Therefore transistor Q3 provides more current than transistor Q4, which destroys symmetry and therefore degrades the linearity of the output stage. In FIG. 3C is shown a method by which the load may be balanced by referencing it to −5 v. However, this would entail a third power supply which is generally an undesirable expense. The circuit shown in FIG. 3D is the method used in the present invention for overcoming these difficulties. In FIG.

3D the Wheatstone bridge arrangement is completed by treating the total external loading of the output stage (exclusive of the 500 ohm analyzer load) as an integral part of that stage. The external load of 116.8 ohms is substantially the sum of the 93 ohm cable terminating resistor 95, the DC resistance of the 500 foot cable 17, and the 3.3 ohm decoupling resistor 93. This load is referenced to the +5 v. power supply rather than to ground. In FIG. 3D it can be seen that a fixed resistance 87 of equal value is connected to the −15 v. power supply terminal, thus completing the bridge and restoring the symmetry. In a balanced bridge of this type no current passes through the center cross connection. For the actual output stage this connection is the "source to sink" junction, and no current passes through it at median bias.

Figure 4A:
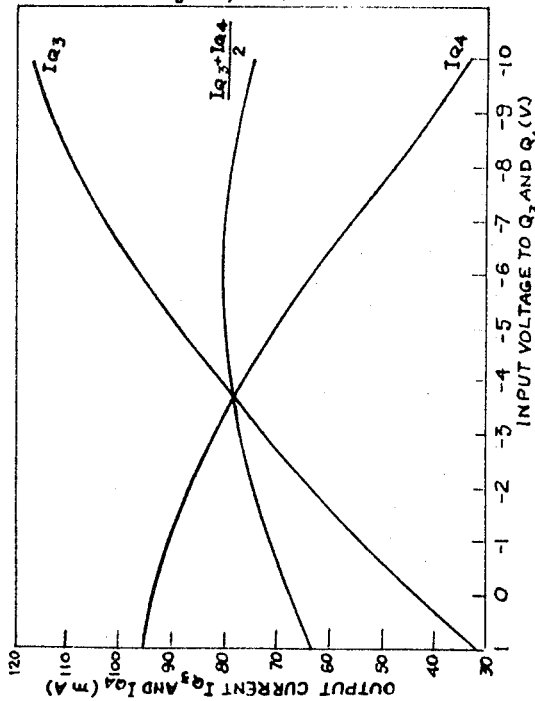
FIGS. 4A and 4B are curves illustrating the characteristics of the output of the amplifier as compared to the input voltage.
Figure 4B:
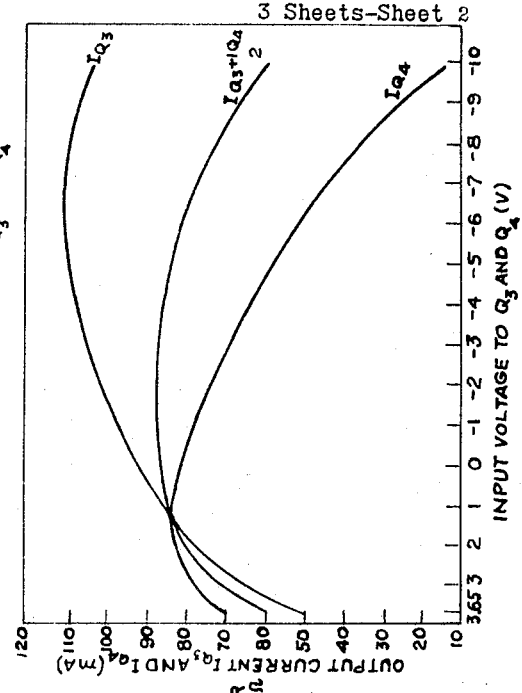

For true complementary currents through transistors Q3 and Q4, threshold potentials must be supplied for their base to emitter junctions. These are provided by the network of three forward biased silicon diodies 77, 79 and 81 and the four resistors 73, 75, 83, and 85 at the input of transistors Q3 and Q4. The resistances are adjusted until an output stage DC characteristic similar to the one shown in FIG. 4A is obtained. Very slight asymmetry in the complementary characteristic curves of transistors Q3 and Q4 and/or unbalanced loading make large shifts in the relative positions of the curves on the current axis as illustrated in FIG. 4B. FIG. 4B represents the output characteristics of the conventional circuit of FIG. 3B. FIG. 4A represents the output characteristic of the circuit of the present invention as shown in FIGS. 1, 2 and 3D. Therefore, not only must the transistors have closely matching betas, but since beta is always a function of current, the parameter $d\beta/dI$ of the transistors as a pair must be essentially zero throughout the dynamic current range.

Overall amplifier linearity is maximized by employing negative voltage feedback from the output junction $e_0$ of the amplifier to the emitter of transistor Q1 of FIG. 1. This configuration lowers the output impedance which is of primary concern when employing a lower impedance temperature compensating network in the feedback loop which is part of the present invention. Connection of the output feedback network to the emitter of Q1 raises the input impedance. This allows use of larger values of resistance in the input voltage divider for a given temperature stability factor. It also reduces pulse undershoot due to differentiation of the signal, when a reasonable size capacitor is used from the photomultiplier anode.

Referring now to the temperature compensating aspect of the present invention, one of the major difficulties encountered in utilizing the photomultiplier tubes employing scintillation detectors is that changes in temperature of the scintillator-photomultipler result in variation of signal pulse-height when measuring a source such as a gamma-rays of a constant energy. The feedback circuit of the present invention is provided to compensate for the gain shift of the photomultiplier-scintillator changes by varying the gain of the amplifier in a manner that is nearly equal and opposite to the change in gain of the photomultiplier-scintillator. A typical photomultiplier-scintillator device may have a negative non-linear temperature coefficient as represented by curve $g$ in FIG. 6B, that is curve $g$ may represent a normalized gain function, for example, normalized at 25° C. The present invention provides an amplifier that has an inverse temperature coefficient herein referred to as a normalized gain function, $g'$, that cancels the detector response, $g$. A perfect compensation would result in the relationship of $$gg' \cong 1 \qquad (2)$$

An amplifier of the present invention employs a large negative voltage feedback in order to achieve the desired excellence of linearity and to satisfy the requirement that the closed loop gain approaches unity. In addition, the amplifier open-loop gain, which is large compared to unity, helps both the feedback factor, $\beta$, and the closed loop gain be concurrent in their approach to unity, that is, these two functions would be substantially inverse functions with respect to each other. Therefore the temperature response of the amplifier with the feedback is substantially inverse to the temperature response, $g''$, of the feedback factor alone, that is $$g'g'' \cong 1 \qquad (3)$$

Combining Equations 2 and 3 it is seen that $$g/g'' \cong 1 \qquad (4)$$

Equation 4 provides that the temperature response of a detector can be cancelled by a feedback factor temperature response with the same magnitude, shape, and sign. Since curve $g$ is a negative function, curve $g''$ must also be negative, and depending upon the degree it can be made to follow curve $g$ of FIG. 6B it will cancel the slope of that curve. That is, the negative temperature coefficient element is inserted in the feedback path so that $\beta$, the fraction of the amplifier output left to oppose the amplifier input, must decrease as temperature increases. This sensing element is indicated in the amplifier circuit as $R_t$ in FIG. 5A and is the shunt arm of the feedback voltage divider. The series arm, $R_F$, has substantially a zero temperature coefficient.

Figure 5A:
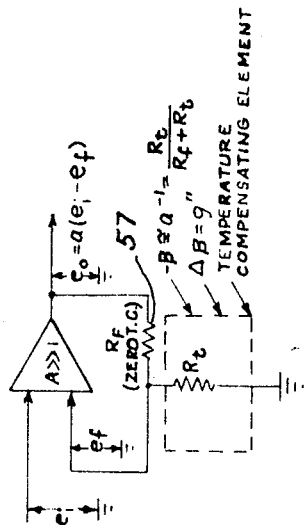
FIGS. 5A and 5B are schematic drawings illustrating the characteristics of the temperature compensating mechanism of the present invention.

It should be noted that if the detector had exhibited a positive temperature coefficient, then the amplifier coefficient, $g'$, would have to be a negative function, and $\Delta\beta$ or the feedback function, $g''$, would be of positive slope. In this case, in order to utilize a negative temperature coefficient sensing element, $R_t$ would occupy the position of $R_F$ rather than as shown in FIG. 5A.

Figure 6A:
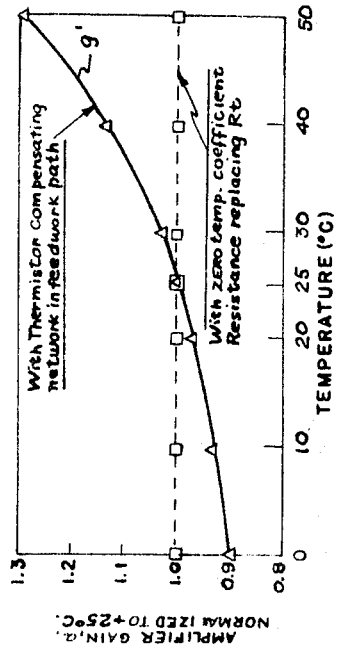
FIGS. 6A and 6B illustrate the amplifier voltage gain as occurs with temperature changes.
Figure 6B:
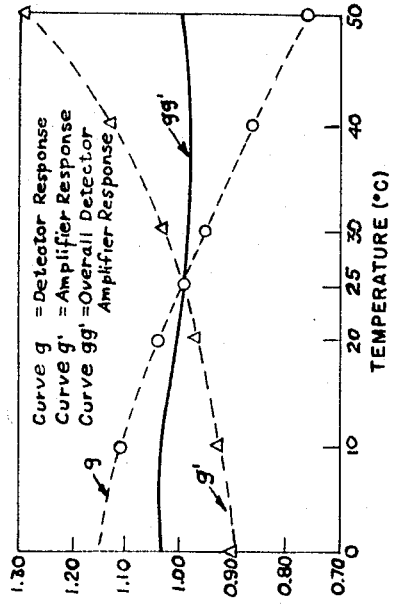
Figure 5B:
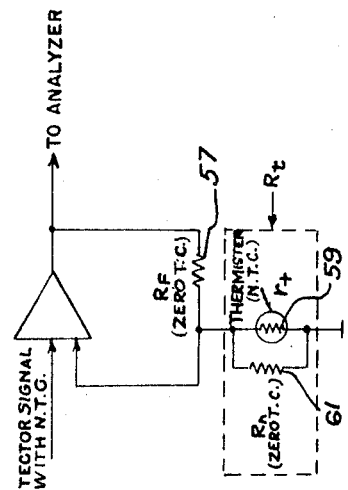

It has been found that a negative temperature coefficient correcting element may be effectively used with the present invention. The thermistor is particularly advantageous as the sensitive element in the feedback network because it has a large negative temperature coefficient. Referring to FIG. 5B, the resistance of thermistor 59 is referred to as $r_t$ which is positioned in the shunt branch of the feedback path as illustrated. The negative temperature coefficient of thermistor 59 is degraded by a parallel resistor 61 ($R_n$) so that the total shunt path, $R_t$, has an intermediate coefficient to match the average slope of the detector response. It should also be noted that the ratio of $R_F$ and $R_t$ throughout the desired temperature range must approximate a specified closed loop gain of the amplifier. Since the choice of resistance value for $R_F$ is narrow, $R_t$ must be chosen with considerable care. After the detector temperature response, $g$, has been determined, its corollary, $g''$, must be approximated in the feedback network. This is achieved by fitting at least several points on the photomultiplier-scintillator gain versus temperature response curve as illustrated by curve $g$ of FIG. 6B with the thermistor response curve $g'$ of FIG. 6B. In FIG. 6B it can be seen that the combination of curves $g$ and $g'$ result in the curve $gg'$ which is the overall relative voltage gain of the complete detector-amplifier system as it varies over the temperature range of 0 to 50° C.

Obviously many modifications and variations of the present invention are possible in the light of the above teachings.

What is claimed is:

1. An electronic device for amplifying and transmitting electrical signals comprising:
   (a) an amplifier having first and second amplifying elements in the output stage,
   (b) a power supply providing a first DC reference signal and a second DC reference signal,
   (c) said first DC reference signal connected to one side of said first amplifying element, said second DC reference signal connected to one side of said second amplifying element,
   (d) one end of a transmission line connected through a first resistor to said one side of said first amplifying element, and (e) the other end of said transmission line connected through a second resistor to said one side of said second amplifying element and to the other side of said first amplifying element and to the other side of said second amplifying element.

2. The device of claim 1 wherein:
(a) said first and second amplifying elements are symmetrically connected transistors.

3. The device of claim 2 wherein:
(a) said first DC reference signal has one polarity and a predetermined magnitude, and
(b) said second DC reference signal has the opposite polarity and a magnitude greater than said predetermined magnitude.

4. The device of claim 1 wherein:
(a) a negative feedback circuit is connected from the other side of said first amplifying element and to the other side of said second amplifying element to a third amplifying element, (b) a network including at least one resistor and a thermistor operatively connected to said negative feedback circuit for varying the negative feedback as a function of temperature.

References Cited

UNITED STATES PATENTS

| | | | |
|---|---|---|---|
| 2,789,164 | 4/1957 | Stanley | 330—13 |
| 3,173,110 | 3/1965 | Albersheim | 330—143 X |
| 3,178,698 | 4/1965 | Graham | 330—143 X |
| 3,223,937 | 12/1965 | McDonald | 330—110 X |
| 3,363,060 | 1/1968 | Grodinsky | 330—143.4 XR |

ROY LAKE, Primary Examiner

J. B. MULLINS, Assistant Examiner

U.S. Cl. X.R.

330—22, 23, 28, 53, 110, 143, 146